US012797785B2

(12) United States Patent
Liu et al.

(10) Patent No.: US 12,797,785 B2
(45) Date of Patent: Nov. 17, 2026

(54) DIGITAL TRANSFORMER MOISTURE ABSORBER AND METHOD FOR MONITORING RESPIRATORY FLOW OF TRANSFORMER

(71) Applicant: STATE GRID SHANXI ELECTRIC POWER RESEARCH INSTITUTE, Taiyuan (CN)

(72) Inventors: Hong Liu, Taiyuan (CN); Hua Yu, Taiyuan (CN); Shuai Li, Taiyuan (CN); Guodong Li, Taiyuan (CN); Shu Niu, Taiyuan (CN); Jizhong Liang, Taiyuan (CN)

(73) Assignee: STATE GRID SHANXI ELECTRIC POWER RESEARCH INSTITUTE, Taiyuan (CN)

( * ) Notice: Subject to any disclaimer, the term of this patent is extended or adjusted under 35 U.S.C. 154(b) by 286 days.

(21) Appl. No.: 18/717,273

(22) PCT Filed: Oct. 8, 2023

(86) PCT No.: PCT/CN2023/123321
§ 371 (c)(1),
(2) Date: Jun. 6, 2024

(87) PCT Pub. No.: WO2024/103993
PCT Pub. Date: May 23, 2024

(65) Prior Publication Data

US 2025/0032972 A1 Jan. 30, 2025

(30) Foreign Application Priority Data

Nov. 18, 2022 (CN) ......................... 202211447537.3

(51) Int. Cl.
*B01D 53/04* (2006.01)
*B01D 53/26* (2006.01)
(Continued)

(52) U.S. Cl.
CPC ..... *B01D 53/0454* (2013.01); *B01D 53/0438* (2013.01); *B01D 53/261* (2013.01);
(Continued)

(58) Field of Classification Search
CPC ............ B01D 53/0454; B01D 53/0438; B01D 53/261; B01D 53/28; B01D 2253/106;
(Continued)

(56) References Cited

U.S. PATENT DOCUMENTS

2021/0223074 A1 7/2021 Tsubota et al.
2022/0208432 A1 6/2022 Scala

FOREIGN PATENT DOCUMENTS

CN 202487337 U 10/2012
CN 205749432 U 11/2016
(Continued)

OTHER PUBLICATIONS

1st Chinese Office Action for Chinese Application No. 202211447537.3, dated Feb. 8, 2023 (Feb. 8, 2023)—7 pages (English translation—5 pages).
(Continued)

*Primary Examiner* — Christopher P Jones
*Assistant Examiner* — Miriam N Ezeluomba
(74) *Attorney, Agent, or Firm* — CM Law; Stephen J. Weed

(57) ABSTRACT

Provided are a digital transformer moisture absorber and a method for monitoring respiratory flow of a transformer. The digital transformer moisture absorber includes a flange. The flange is fixedly connected to an upper cover. The upper cover has a preformed opening and is connected to a first flow meter through the preformed opening. Two ends of the first flow meter communicate with a moisture absorber gas breathing channel. A silica gel barrel is disposed between the upper cover and a lower cover. The lower cover has a
(Continued)

preformed opening and is connected to the moisture absorber gas breathing channel through the preformed opening. The moisture absorber gas breathing channel is connected to the second flow meter. Two ends of the second flow meter communicate with the moisture absorber gas breathing channel. A control module and a power supply module are disposed in the control unit.

7 Claims, 2 Drawing Sheets

(51) Int. Cl.
*B01D 53/28* (2006.01)
*H01F 27/08* (2006.01)

(52) U.S. Cl.
CPC ............. *B01D 53/28* (2013.01); *H01F 27/08* (2013.01); *B01D 2253/106* (2013.01); *B01D 2257/80* (2013.01); *B01D 2259/40088* (2013.01)

(58) Field of Classification Search
CPC ...... B01D 2259/40088; B01D 2257/80; H01F 27/08; H01F 27/40; H01F 2027/404; H01F 27/14; H01F 27/402; G01F 1/36
USPC .............................................................. 95/23
See application file for complete search history.

(56) References Cited

FOREIGN PATENT DOCUMENTS

| | | | | | |
|---|---|---|---|---|---|
| CN | 108597777 | A | | 9/2018 | |
| CN | 109102997 | A | | 12/2018 | |
| CN | 115172017 | A | * | 10/2022 | ............. G05D 27/02 |
| CN | 115621002 | A | | 1/2023 | |
| JP | 2013131511 | A | | 7/2013 | |

OTHER PUBLICATIONS

International Search Report for International Application No. PCT/CN2023/123321, dated Dec. 27, 2023 (Dec. 27, 2023)—5 pages.

* cited by examiner

DIGITAL TRANSFORMER MOISTURE ABSORBER AND METHOD FOR MONITORING RESPIRATORY FLOW OF TRANSFORMER

This is a national stage application filed under 35 U.S.C. 371 based on International Patent Application No. PCT/CN2023/123321, filed Oct. 8, 2023, which claims priority to Chinese Patent Application No. 202211447537. 3 filed Nov. 18, 2022, the disclosures of which are incorporated herein by reference in their entireties.

TECHNICAL FIELD

The present application provides a digital transformer moisture absorber and a method for monitoring respiratory flow of a transformer, which belong to the technical field of moisture absorbers.

BACKGROUND

A transformer moisture absorber is an important protection component of a power transformer. The moisture absorber is connected to a transformer capsule in an oil conservator through a connection pipe. The transformer capsule, by its own deformation, balances the pressure generated by the thermal expansion and contraction of the transformer oil body. The outlet after the pressure is balanced is the moisture absorber. The moisture absorber is equipped with silica gel particles inside. Thus, the air humidity in the environment can be filtered out to prevent the moist air from entering the transformer capsule in the oil conservator and condensing into condensed water, which stops the working ability of the transformer capsule from being affected. However, during operation, it is found that the silica gel particles in the moisture absorber are in a certain state of crushing. The crushed silica gel particles cause an airway obstruction to a certain extent, leading to difficulty in breathing, increasing the pressure inside the transformer, and causing the protection component of the transformer to act and the transformer to trip. Therefore, it is essential to monitor the amount of gas entering and exiting the breathing port of the moisture absorber. In a large number of such operating failures, if the breathing volume at the breathing port can be effectively monitored, most accidents can be avoided.

The transformer moisture absorbers in the related art mainly rely on power grid operation and maintenance personnel to actively monitor and check whether the oil cup below a moisture absorber is bubbling to determine whether the moisture absorber is breathing. However, the volume of breathing cannot be determined, which is not conducive to remote monitoring and analysis. As a result, it is often difficult to accurately grasp the breathing state of a moisture absorber, bringing great trouble to the operation and maintenance personnel.

SUMMARY

The present application proposes a digital transformer moisture absorber and a method for monitoring respiratory flow of a transformer to solve the problems that transformer moisture absorbers in the related technology cannot monitor gas flow and cannot be remotely monitored and untimely detection of transformer faults is resulted.

The technical solution adopted in the present application is as follows: A digital transformer moisture absorber includes a flange, a first flow meter, an upper cover, a silica gel barrel, a lower cover, a water outlet, a solenoid valve, a second flow meter, and an oil cup. The flange is fixedly connected to the upper cover through a screw. The upper cover has a preformed opening and is connected to the first flow meter through the preformed opening. Two ends of the first flow meter communicate with a moisture absorber gas breathing channel. The silica gel barrel is disposed between the upper cover and the lower cover. desiccant silica gel is placed inside the silica gel barrel. A heating cable is disposed on the outside of the silica gel barrel. A glass cover is also disposed on the outside of the silica gel barrel. A gap is disposed between the glass cover and the silica gel barrel. The lower cover has a preformed opening and is connected to the moisture absorber gas breathing channel through the preformed opening. The moisture absorber gas breathing channel is connected to the second flow meter. Two ends of the second flow meter communicate with the moisture absorber gas breathing channel. The oil cup is disposed below the lower cover. A funnel-shaped overflow tank is disposed on the lower cover. The water outlet is also disposed on the lower cover. The solenoid valve is disposed at the water outlet.

A control unit is fixed on the outside of the glass cover. A control module and a power supply module are disposed in the control unit. The control module is separately connected to the first flow meter, the second flow meter, the heating cable, and the solenoid valve through a wire.

A wireless communication module is also disposed in the control unit. The control module communicates with a transformer central control through the wireless communication module.

A method for monitoring respiratory flow of a transformer adopts a digital transformer moisture absorber. The method includes S1, S2, S3, S4, and S5.

In S1, the digital transformer moisture absorber is connected to a transformer capsule in a transformer oil conservator through a connection pipe.

In S2, the control unit of the digital transformer moisture absorber and multiple components on the control unit are enabled, the control unit analyzes inlet respiratory flow and outlet respiratory flow collected by the first flow meter and the second flow meter and comprehensively determines mines whether the transformer oil conservator is suffocated and whether the moisture absorber is blocked.

In S3, when it is determined that the moisture absorber is not blocked, whether the transformer oil conservator is suffocated is determined.

In S4, when it is determined that the moisture absorber is blocked, the control unit first starts the heating cable to make the heating cable to generate heat that is capable of evaporating water vapor from the silica gel barrel, where the water vapor condenses into a water droplet on the outer shell of the glass cover and flows into the funnel-shaped overflow tank processed on the lower cover; and the control unit starts the solenoid valve to drain condensed water out of the moisture absorber through the water port.

In S5, after determining in S4 whether the blockage of the moisture absorber is caused by the moisture, the moisture absorber is still blocked is determined after the dehumidification step, then the silica gel barrel of the moisture absorber is not damped is determined, and reminder information is sent to the operation and maintenance personnel through the wireless communication module.

The step S2 in which the control unit analyzes the inlet respiratory flow and the outlet respiratory flow collected by the first flow meter and the second flow meter and whether the transformer oil conservator is suffocated and whether the moisture absorber is blocked are comprehensively determined includes S2.1, S2.2, S2.3, and S2.4.

In S2.1, when the inlet respiratory flow data1 of the digital transformer moisture absorber is equal to the outlet respiratory flow data2 of the digital transformer moisture absorber, and the problem of the transformer moisture absorber being blocked is excluded, S2.2 and S2.3 are entered; when the inlet respiratory flow data1 of the digital transformer moisture absorber is not equal to the outlet respiratory flow data2, and S2.4 is entered.

In S2.2, when the inlet respiratory flow data1 of the digital transformer moisture absorber is less than the normal inlet respiratory flow data of the moisture absorber, whether a suffocation problem exists inside the transformer oil conservator is determined, and operation and maintenance personnel are reminded to perform power outage inspection of the oil conservator.

In S2.3, when the inlet respiratory flow data1 of the digital transformer moisture absorber is equal to the normal inlet respiratory flow data of the moisture absorber, and it is determined that the suffocation problem inside the transformer oil conservator does not exist.

In S2.4, when the inlet respiratory flow data1 of the digital transformer moisture absorber is greater than the outlet respiratory flow data2, it is determined that the silica gel barrel (5) of the moisture absorber is blocked, and S4 is entered.

After the moisture absorber performs dehumidification operation in S4 and after a preset time interval, it is re-determined whether the inlet respiratory flow data1 of the digital transformer moisture absorber is equal to the outlet respiratory flow data2; if the inlet respiratory flow data1 of the digital transformer moisture absorber is equal to the outlet respiratory flow data2, it is indicated that the blockage of the moisture absorber is caused by moisture in the silica gel barrel, and in this case, respiration of the moisture absorber is normal; if the inlet respiratory flow data1 of the digital transformer moisture absorber is not equal to the outlet respiratory flow data2, S5 is entered.

BRIEF DESCRIPTION OF DRAWINGS

The present application is described below in conjunction with the drawings.

REFERENCE LIST

Figure 1:
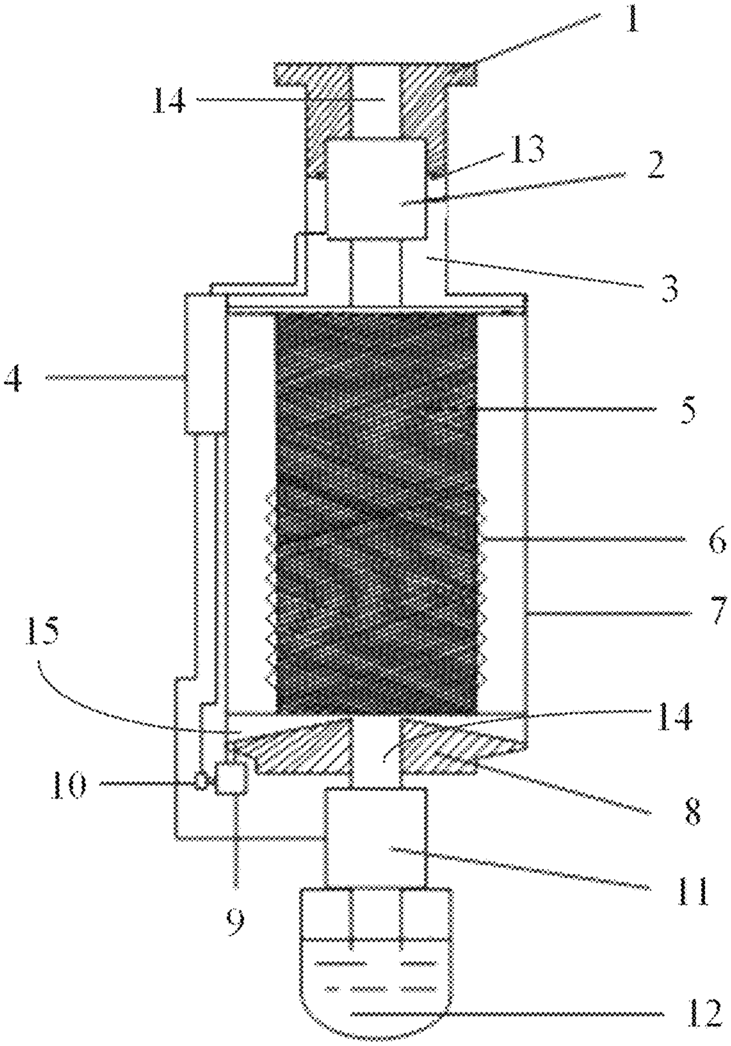
FIG. 1 is a diagram illustrating the structure of a digital transformer moisture absorber according to the present application.

1 flange
2 first flow meter
3 upper cover
4 control unit
5 silica gel barrel
6 heating cable
7 glass cover
8 lower cover
9 water port
10 solenoid valve
11 second flow meter
12 oil cup
13 screw
14 moisture absorber gas breathing channel
15 funnel-shaped overflow tank

DETAILED DESCRIPTION

As shown in FIG. 1, the digital transformer moisture absorber provided by the present application includes a flange 1, a first flow meter 2, an upper cover 3, a control unit 4, a silica gel barrel 5, a heating cable 6, a glass cover 7, a lower cover 8, a water port 9, a solenoid valve 10, a second flow meter 11, and an oil cup 12.

The flange 1 is connected to the upper cover 3 through an M6 screw 13. The upper cover 3 has a preformed opening and is connected to the first flow meter 2 through the preformed opening. Two ends of the first flow meter 2 are bonded to a moisture absorber gas breathing channel through the sealant. The first flow meter 2 is connected to the control unit 4 through a data line. The control unit 4 contains a control module and a power supply module of the entire system.

The center of the upper cover 3 is connected to a cylindrical silica gel barrel 5. desiccant silica gel is installed inside the silica gel barrel 5. The outside of the silica gel barrel 5 is equipped with a heating cable 6 wound with a copper wire. The glass cover 7 is a cylindrical shell. A sealing washer is disposed on an upper edge and a lower edge of the glass cover 7. The sealing washers are installed between the upper cover 3 and the cylindrical silica gel barrel 5 and between the cylindrical silica gel barrel 5 and the lower cover 8. The sealing washer is used as the outermost layer of the silica gel barrel 5.

Figure 2:
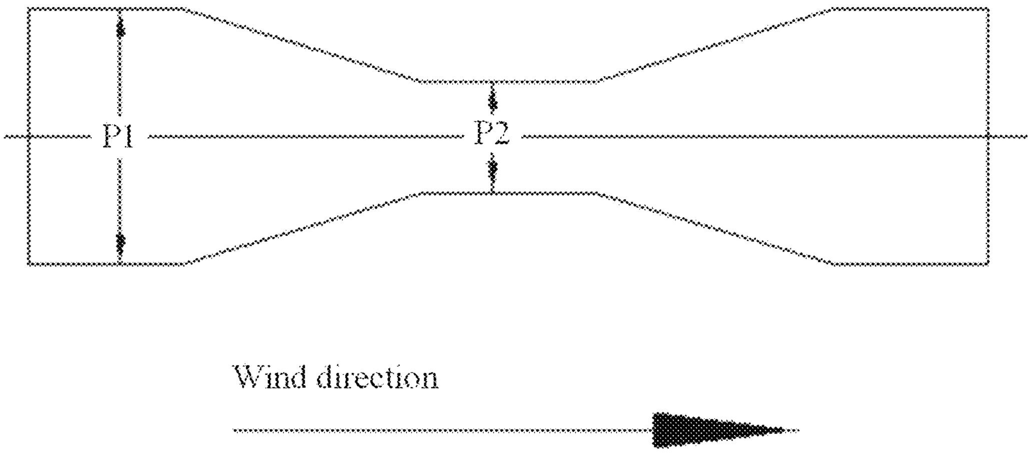
FIG. 2 is a diagram illustrating the flow detection of a venturi flow meter used in the present application.

The lower cover 8 has a preformed opening and is connected to the moisture absorber gas breathing channel 14 through the preformed opening. The moisture absorber gas breathing channel 14 is connected to the second flow meter 11. Similarly, the second flow meter 11 is connected to the control unit 4 through a data line. The first flow meter 2 and the second flow meter 11 each use a flow meter with a partially contracted venturi inside as shown in FIG. 2, and flow value is calculated based on the linear relationship between the pressure difference and flow generated when the airflow passes through a narrow airway P2 in a channel P1.

After analyzing the data collected by the first flow meter 2 and the second flow meter 11, the control unit 4 determines that the silica gel barrel 5 is blocked. The control unit 4 starts the heating cable 6. The heating cable 6 generates heat that is capable of evaporating water vapor from the silica gel barrel 5. Water vapor overflows from the silica gel barrel 5 into the glass cover 7 through a mesh, condenses into water droplets on the inner wall of the outer shell of the glass cover 7, and flows into the funnel-shaped overflow tank processed on the lower cover 8. The control unit 4 starts the solenoid valve 10 to drain the condensed water out of the moisture absorber through the water port 9. An oil cup 12 is installed below the lower cover 8 so that the respiration in the moisture absorber can be observed, and the starting effect of the control unit 4 can be verified mutually.

Figure 3:
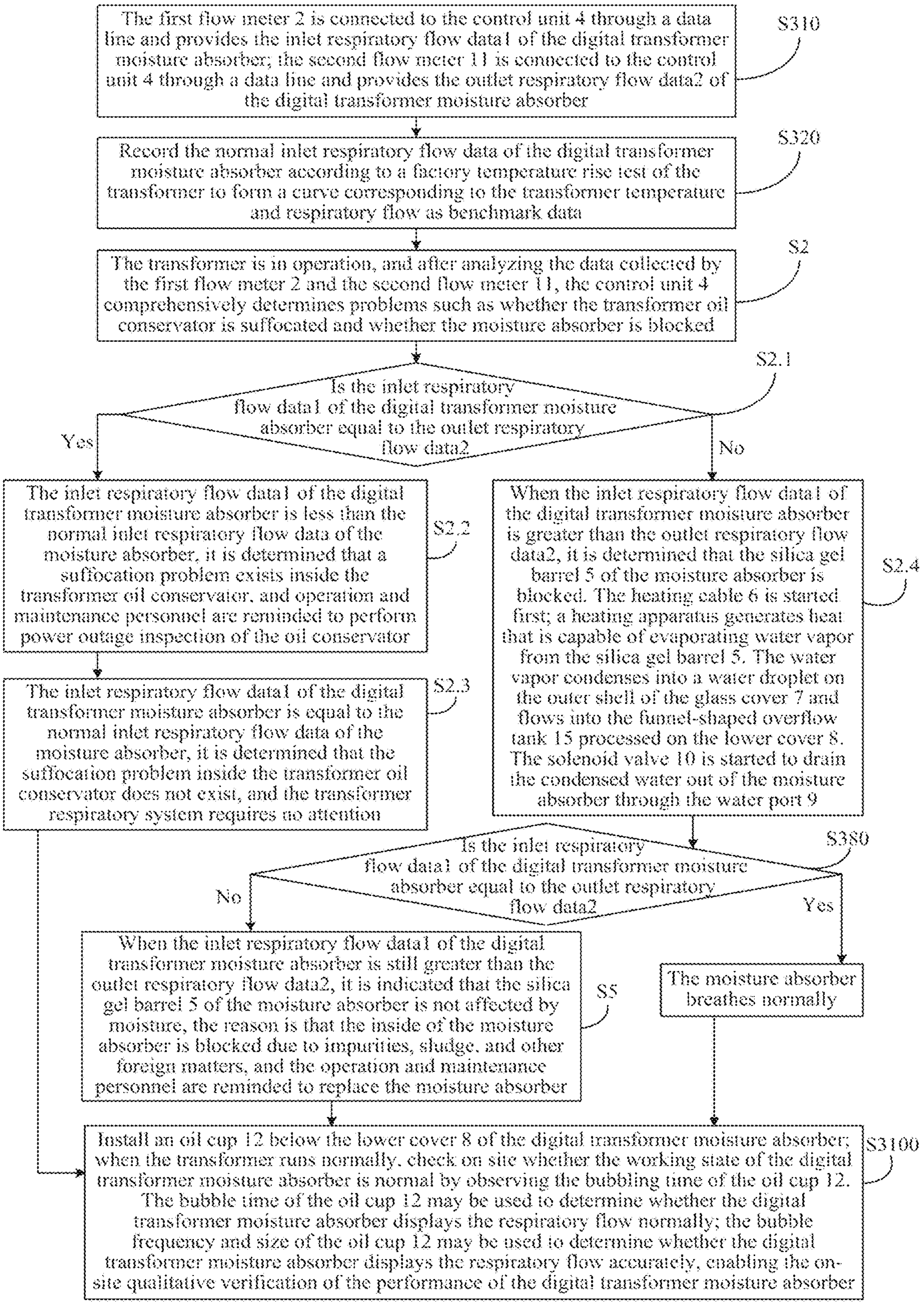
FIG. 3 is a flowchart of a method for monitoring respiratory flow of a transformer according to the present application.

As shown in FIG. 3, the method for monitoring respiratory flow of a transformer according to the present application includes the following steps:

In S310, the first flow meter 2 is connected to the control unit 4 through a data line and provides the inlet respiratory flow data1 of the digital transformer moisture absorber; the second flow meter 11 is connected to the control unit 4 through a data line and provides the outlet respiratory flow data2 of the digital transformer moisture absorber.

In S320, the normal inlet respiratory flow data of the digital transformer moisture absorber is recorded according to a factory temperature rise test of the transformer to form a curve corresponding to the transformer temperature and respiratory flow as benchmark data.

In S2, the transformer is in operation, and after analyzing the data collected by the first flow meter 2 and the second flow meter 11, the control unit 4 comprehensively determines problems such as whether the transformer oil conservator is suffocated and whether the moisture absorber is blocked.

In S2.1, when the inlet respiratory flow data1 of the digital transformer moisture absorber is equal to the outlet respiratory flow data2, and the problem of the transformer moisture absorber being blocked is excluded, S2.2 or S2.3 are entered; when the inlet respiratory flow data1 of the digital transformer moisture absorber is not equal to the outlet respiratory flow data2, and S2.4 is entered.

In S2.2, when the inlet respiratory flow data1 of the digital transformer moisture absorber is less than the normal inlet respiratory flow data of the moisture absorber given by S320, it is determined that a suffocation problem exists inside the transformer oil conservator, and operation and maintenance personnel are reminded to perform power outage inspection of the oil conservator.

In S2.3, when the inlet respiratory flow data1 of the digital transformer moisture absorber is equal to the normal inlet respiratory flow data of the moisture absorber given by S320, it is determined that the suffocation problem inside the transformer oil conservator does not exist, and the transformer respiratory system requires no attention.

In S2.4, when the inlet respiratory flow data1 of the digital transformer moisture absorber is greater than the outlet respiratory flow data2, it is determined that the silica gel barrel 5 of the moisture absorber is blocked. The heating cable 6 is started first; a heating apparatus generates heat that is capable of evaporating water vapor from the silica gel barrel 5. The water vapor condenses into a water droplet on the outer shell of the glass cover 7 and flows into the funnel-shaped overflow tank 15 processed on the lower cover 8. The solenoid valve 10 is started to drain the condensed water out of the moisture absorber through the water port 9.

In S380, after 1 hour or other set time, when the inlet respiratory flow data1 of the digital transformer moisture absorber is equal to the outlet respiratory flow data2, indicating that the moisture problem of the silica gel barrel 5 of the moisture absorber is solved and the moisture absorber breathes normally; when the inlet respiratory flow data1 of the digital transformer moisture absorber is not equal to the outlet respiratory flow data2, and S5 is entered.

In S5, when the inlet respiratory flow data1 of the digital transformer moisture absorber is still greater than the outlet respiratory flow data2, it is indicated that the silica gel barrel 5 of the moisture absorber is not affected by moisture, the reason is that the inside of the moisture absorber is blocked due to impurities, sludge, and other foreign matters, and the operation and maintenance personnel are reminded to replace the moisture absorber.

In S3100, an oil cup 12 is installed below the lower cover 8 of the digital transformer moisture absorber; when the transformer runs normally, whether the working state of the digital transformer moisture absorber is normal is checked on site by observing the bubbling time of the oil cup 12. The bubble time of the oil cup 12 may be used to determine whether the digital transformer moisture absorber displays the respiratory flow normally; the bubble frequency and size of the oil cup 12 may be used to determine whether the digital transformer moisture absorber displays the respiratory flow accurately, enabling the on-site qualitative verification of the performance of the digital transformer moisture absorber.

The digital transformer moisture absorber and the method for monitoring respiratory flow of a transformer according to the present application achieve the monitoring of the amount of gas entering and exiting the breathing port of the moisture absorber, thereby counting the breathing capacity of the transformer and forming data diagnosis. Moreover, early detection of transformer faults effectively avoids accidents. Thus, the digital transformer moisture absorber and the method for monitoring respiratory flow of a transformer have broad application prospects.

What is claimed is:

1. A method for monitoring respiratory flow of a transformer, wherein a digital transformer moisture absorber is used, and the digital transformer moisture absorber comprises a flange, a first flow meter, an upper cover, a silica gel barrel, a lower cover, a water outlet, a solenoid valve, a second flow meter, and an oil cup; wherein the flange is fixedly connected to the upper cover through a screw, the upper cover has a preformed opening and is connected to the first flow meter through the preformed opening, two ends of the first flow meter communicate with a moisture absorber gas breathing channel, the silica gel barrel is disposed between the upper cover and the lower cover, desiccant silica gel is placed inside the silica gel barrel, a heating cable is disposed on an outside of the silica gel barrel, a glass cover is further disposed on the outside of the silica gel barrel, and a gap is disposed between the glass cover and the silica gel barrel, the lower cover has a preformed opening and is connected to the moisture absorber gas breathing channel through the preformed opening, the moisture absorber gas breathing channel is connected to the second flow meter, two ends of the second flow meter communicate with the moisture absorber gas breathing channel, the oil cup is disposed below the lower cover, a funnel-shaped overflow tank is disposed on the lower cover, the water outlet is further disposed on the lower cover, and the solenoid valve is disposed at the water outlet;

a control unit is fixed on an outside of the glass cover, a control module and a power supply module are disposed in the control unit, the control module is separately connected to the first flow meter, the second flow meter, the heating cable, and the solenoid valve through a wire, a wireless communication module is further disposed in the control unit, and the control module communicates with a transformer central control through the wireless communication module; and the method for monitoring the respiratory flow of the transformer comprises:

S1, connecting the digital transformer moisture absorber to a transformer capsule in a transformer oil conservator through a connection pipe;

S2, enabling the control unit of the digital transformer moisture absorber and a plurality of components on the control unit, analyzing inlet respiratory flow and outlet respiratory flow collected by the first flow meter and the second flow meter by the control unit, and comprehensively determining whether an airflow obstruction condition exists inside the transformer off conservator and whether the moisture absorber is blocked by the control unit; wherein analyzing the inlet respiratory flow and the outlet respiratory flow collected by the first flow meter and the second flow meter by the control unit, and comprehensively determining whether the airflow obstruction condition exists inside the transformer oil conservator and whether the moisture absorber is blocked by the control unit comprises:

S2.1, in response to inlet respiratory flow data1 of the digital transformer moisture absorber being equal to outlet respiratory flow data2 of the digital transformer moisture absorber, excluding the problem of the transformer moisture absorber being blocked, and entering S2.2 and S2.3; in response to inlet respiratory flow data1 of the digital transformer moisture absorber not being equal to outlet respiratory flow data2, entering S2.4;

S2.2, in response to the inlet respiratory flow data1 of the digital transformer moisture absorber being less than a benchmark respiratory flow value of the digital transformer moisture absorber, determining that the airflow obstruction condition exists inside the transformer oil conservator, and reminding operation and maintenance personnel to perform a power outage inspection of the oil conservator;

S2.3, in response to the inlet respiratory flow data1 of the digital transformer moisture absorber being equal to the benchmark respiratory flow value of the moisture absorber, and determining that no airflow obstruction condition exists inside the transformer oil conservator; and S2.4, in response to the inlet respiratory flow data1 of the digital transformer moisture absorber being greater than the outlet respiratory flow data2, determining that the silica gel barrel of the moisture absorber is blocked, and entering S4;

S3, in response to determining that the moisture absorber is not blocked, determining whether the airflow obstruction condition exists inside the transformer oil conservator;

S4, in response to determining that the moisture absorber is blocked, starting the heating cable first by the control unit to make the heating cable generate heat that is capable of evaporating water vapor from the silica gel barrel, wherein the water vapor condenses into a water droplet on an outer shell of the glass cover and flows into the funnel-shaped overflow tank processed on the lower cover; and starting the solenoid valve by the control unit to drain condensed water out of the digital transformer moisture absorber through the water outlet; wherein after the digital transformer moisture absorber performs dehumidification operation in S4 and after a preset time interval, the control unit is re-determined whether the inlet respiratory flow data1 of the digital transformer moisture absorber is equal to the outlet respiratory flow data2; in response to the inlet respiratory flow data1 of the digital transformer moisture absorber being equal to the outlet respiratory flow data2, it is indicated that blockage of the digital transformer moisture absorber is caused by moisture in the silica gel barrel, and in this case, respiration of the moisture absorber is normal; in response to the inlet respiratory flow data1 of the digital transformer moisture absorber not being equal to the outlet respiratory flow data2, S5 is entered; and S5, in response to determining that the moisture absorber is still blocked after dehumidification step after determining in S4 whether the blockage of the moisture absorber is caused by the moisture, determining that the silica gel barrel of the moisture absorber is not damped, and sending reminder information to the operation and maintenance personnel through the wireless communication module.

2. The method for monitoring the respiratory flow of the transformer according to claim 1, wherein before S1, the method further comprises:

recording the benchmark respiratory flow value of the digital transformer moisture absorber according to a factory temperature rise test of the transformer to form a curve corresponding to transformer temperature and respiratory flow as benchmark data.

3. The method for monitoring the respiratory flow of the transformer according to claim 1, wherein the first flow meter and the second flow meter each use a venturi flow meter.

4. The method for monitoring the respiratory flow of the transformer according to claim 1, wherein the two ends of the first flow meter connected to the moisture absorber gas breathing channel and the two ends of the second flow meter connected to the moisture absorber gas breathing channel are separately sealed by sealing silica gel.

5. The method for monitoring the respiratory flow of the transformer according to claim 1, wherein a sealing washer is disposed on an upper edge and a lower edge of the glass cover.

6. The method for monitoring the respiratory flow of the transformer according to claim 1, wherein the first flow meter collects the inlet respiratory flow of the digital transformer moisture absorber, and the second flow meter collects the outlet respiratory flow of the digital transformer moisture absorber.

7. A digital transformer moisture absorber, comprising a flange, a first flow meter, an upper cover, a silica gel barrel, a lower cover, a water outlet, a solenoid valve, a second flow meter, and an oil cup; wherein the flange is fixedly connected to the upper cover through a screw, the upper cover has a preformed opening and is connected to the first flow meter through the preformed opening, two ends of the first flow meter communicate with a moisture absorber gas breathing channel, the silica gel barrel is disposed between the upper cover and the lower cover, desiccant silica gel is placed inside the silica gel barrel, a heating cable is disposed on an outside of the silica gel barrel, a glass cover is further disposed on the outside of the silica gel barrel, and a gap is disposed between the glass cover and the silica gel barrel, the lower cover has a preformed opening and is connected to the moisture absorber gas breathing channel through the preformed opening, the moisture absorber gas breathing channel is connected to the second flow meter, two ends of the second flow meter communicate with the moisture absorber gas breathing channel, the oil cup is disposed below the lower cover, a funnel-shaped overflow tank is disposed on the lower cover, the water outlet is further disposed on the lower cover, and the solenoid valve is disposed at the water outlet; and a control unit is fixed on an outside of the glass cover, a control module and a power supply module are disposed in the control unit, the control module is separately connected to the first flow meter, the second flow meter, the heating cable, and the solenoid valve through a wire, a wireless communication module is further disposed in the control unit, and the control module communicates with a transformer central control through the wireless communication module.

* * * * *